(12) United States Patent
Miller

(10) Patent No.: US 11,448,739 B2
(45) Date of Patent: Sep. 20, 2022

(54) DERIVATION OF DEPTH INFORMATION FROM TIME-OF-FLIGHT (TOF) SENSOR DATA

(71) Applicant: Synaptics Incorporated, San Jose, CA (US)

(72) Inventor: Mark E. Miller, Mission Viejo, CA (US)

(73) Assignee: Synaptics Incorporated, San Jose, CA (US)

(*) Notice: Subject to any disclaimer, the term of this patent is extended or adjusted under 35 U.S.C. 154(b) by 462 days.

(21) Appl. No.: 16/750,970

(22) Filed: Jan. 23, 2020

(65) Prior Publication Data

US 2020/0284885 A1 Sep. 10, 2020

Related U.S. Application Data

(60) Provisional application No. 62/815,972, filed on Mar. 8, 2019.

(51) Int. Cl.
*H04B 10/00* (2013.01)
*G01S 7/4865* (2020.01)
*G01S 17/32* (2020.01)

(52) U.S. Cl.
CPC ........... *G01S 7/4865* (2013.01); *G01S 17/32* (2013.01)

(58) Field of Classification Search
CPC combination set(s) only.
See application file for complete search history.

(56) References Cited

U.S. PATENT DOCUMENTS

| | | | |
|---|---|---|---|
| 11,092,679 B2* | 8/2021 | Baron | G01S 17/10 |
| 2010/0008588 A1* | 1/2010 | Feldkhun | G01S 7/499 |
| | | | 382/206 |
| 2016/0097844 A1* | 4/2016 | Takano | G01S 7/497 |
| | | | 356/5.01 |
| 2016/0124089 A1* | 5/2016 | Meinherz | G01S 7/497 |
| | | | 356/5.01 |
| 2018/0246212 A1* | 8/2018 | Moore | G01C 3/08 |
| 2018/0252894 A1* | 9/2018 | Tang-Jespersen | |
| | | | H04N 5/23216 |
| 2018/0259628 A1* | 9/2018 | Plank | G01S 7/497 |
| 2018/0321363 A1* | 11/2018 | Beer | G01S 17/10 |
| 2019/0094364 A1* | 3/2019 | Fine | G01S 17/10 |
| 2019/0154439 A1* | 5/2019 | Binder | G01B 11/26 |
| 2019/0181171 A1* | 6/2019 | Tadmor | H01L 27/14605 |
| 2019/0344493 A1* | 11/2019 | Amano | G06T 7/001 |

(Continued)

*Primary Examiner* — Agustin Bello
(74) *Attorney, Agent, or Firm* — Paradice & Li LLP

(57) ABSTRACT

A time-of-flight sensor includes a light source to transmit periodic bursts light in a direction of one or more objects and an array of optical sensing elements to detect light reflected from the one or more objects and generate sensor data corresponding to the detected light. A distance calculator determines depth information of the one or more objects by determining a general phase shift of the reflected light relative to the transmitted light based on a first frame of the sensor data and a second frame of the sensor data, calculating an incremental phase shift of the reflected light relative to the transmitted light based on a linear relationship between the first frame and the second frame in relation to the general phase shift, and combining the general phase shift with the incremental phase shift to determine an actual phase shift of the reflected light relative to the transmitted light.

20 Claims, 9 Drawing Sheets

(56) References Cited

U.S. PATENT DOCUMENTS

| | | | |
|---|---|---|---|
| 2019/0346541 A1* | 11/2019 | Boutaud | G01S 17/89 |
| 2020/0057149 A1* | 2/2020 | Kugimiya | G01S 17/36 |
| 2020/0103526 A1* | 4/2020 | Morcom | G01S 17/36 |
| 2020/0284885 A1* | 9/2020 | Miller | G01S 17/32 |
| 2020/0393545 A1* | 12/2020 | Shani | G01S 17/894 |
| 2020/0400820 A1* | 12/2020 | Nauen | G01S 7/484 |
| 2021/0116549 A1* | 4/2021 | Lei | G01S 7/4861 |
| 2021/0223371 A1* | 7/2021 | Meynants | G01S 17/42 |
| 2021/0318443 A1* | 10/2021 | Ding | G01S 17/32 |
| 2022/0050185 A1* | 2/2022 | Amaya-Benitez | G01S 17/89 |
| 2022/0075027 A1* | 3/2022 | Kahana | G01S 17/08 |

* cited by examiner

DERIVATION OF DEPTH INFORMATION FROM TIME-OF-FLIGHT (TOF) SENSOR DATA

CROSS-REFERENCE TO RELATED APPLICATION

This application claims priority and benefit under 35 USC § 119(e) to U.S. Provisional Patent Application No. 62/815,972, filed on Mar. 8, 2019, which is incorporated herein by reference in its entirety.

TECHNICAL FIELD

The present embodiments relate generally to time-of-flight (ToF) sensors, and specifically to deriving depth information from ToF sensor data.

BACKGROUND OF RELATED ART

A time-of-flight (ToF) sensor may determine the distances of objects in its vicinity by measuring the time for light to travel from the sensor, to an object, and (after reflection) back to the sensor. The ToF sensor may include a light source to transmit the light in a direction of the object and one or more light receptors to detect and/or capture the reflected light from the object. The light receptors may be located adjacent to (or in close proximity of) the light source to ensure a relatively accurate timing relationship between the transmitted light and the reflected light. The ToF sensor may then calculate the distance to the object based on a timing relationship between the transmitted light and the reflected light (e.g., using known properties of light).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for determining depth information is disclosed. One innovative aspect of the subject matter of this disclosure can be implemented in a time-of-flight (ToF) sensor including a light source configured to transmit periodic bursts of light in a direction of one or more objects, an array of optical sensing elements configured to detect light reflected from the one or more objects, and a distance calculator configured to receive sensor data corresponding to the detected light from the array of optical sensing elements. The distance calculator is further configured to determine a general phase shift of the reflected light relative to the transmitted light based at least in part on a first frame of the sensor data and a second frame of the sensor data, calculate an incremental phase shift of the reflected light relative to the transmitted light based on a linear relationship between the first frame and the second frame in relation to the general phase shift, and combine the general phase shift with the incremental phase shift to determine an actual phase shift of the reflected light relative to the transmitted light. As described in greater detail below, the general phase shift may correspond to a particular "quadrant" of the illumination period for a respective burst of transmitted light (e.g., a 0°, 90°, 180°, or 270° offset with respect to the start of the burst). The distance calculator may determine depth information for the one or more objects based on the actual phase shift.

Another innovative aspect of the subject matter of this disclosure can be implemented in a method of determining depth information. The method includes steps of receiving sensor data from an array of optical sensing elements configured to detect light reflected from the one or more objects; determining a general phase shift of the reflected light relative to respective bursts of light periodically transmitted in a direction of the one or more objects based at least in part on a first frame of the sensor data and a second frame of the sensor data; calculating an incremental phase shift of the reflected light relative to the transmitted light based on a linear relationship between the first frame and the second frame in relation to the general phase shift; combining the general phase shift with the incremental phase shift to determine an actual phase shift of the reflected light relative to the transmitted light; and determining depth information for the one or more objects based on the actual phase shift.

Another innovative aspect of the subject matter of this disclosure can be implemented in a sensing device including a processing system and a memory. The memory stores instructions that, when executed by the processing system, cause the sensing device to receive sensor data from an array of optical sensing elements configured to detect light reflected from one or more objects, determine a general phase shift of the reflected light relative to respective bursts of light periodically transmitted in a direction of the one or more objects based at least in part on a first frame of the sensor data and a second frame of the sensor data, calculate an incremental phase shift of the reflected light relative to the transmitted light based on a linear relationship between the first frame and the second frame in relation to the general phase shift, combine the general phase shift with the incremental phase shift to determine an actual phase shift of the reflected light relative to the transmitted light, and determine depth information for the one or more objects based on the actual phase shift.

BRIEF DESCRIPTION OF THE DRAWINGS

The present embodiments are illustrated by way of example and are not intended to be limited by the figures of the accompanying drawings.

DETAILED DESCRIPTION

Figure 1:
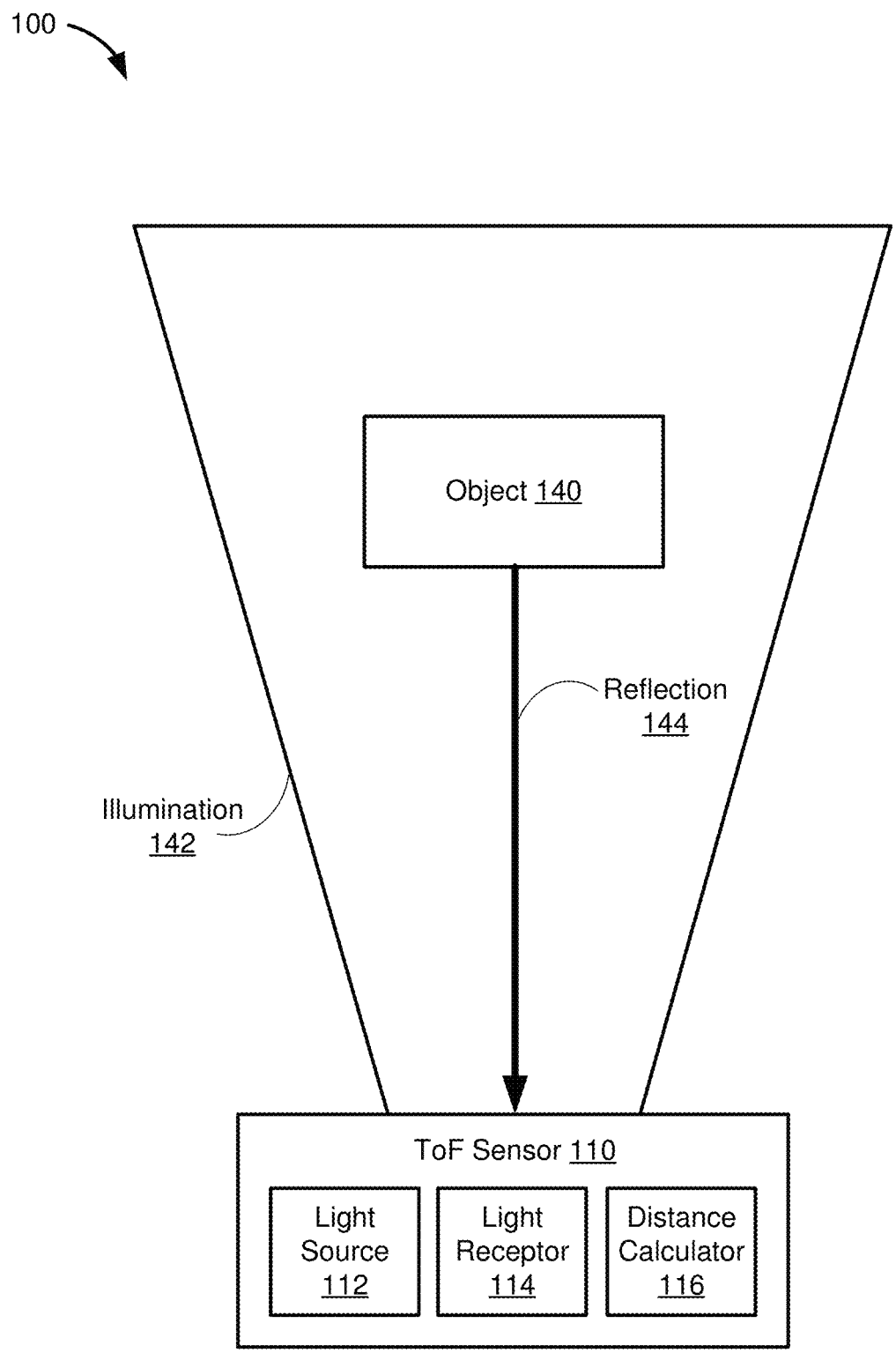
FIG. 1 shows an example environment within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, special purpose processor, conventional processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

FIG. 1 shows an example environment 100 within which the present embodiments may be implemented. The environment 100 includes a time-of-flight (ToF) sensor 110 and an object 140 located within sensing range of the ToF sensor 110 (e.g., within the sensor's field of view). The ToF sensor 110 may be configured to determine depth information (e.g., distances) of nearby objects by illuminating the sensor's field of view and measuring the light reflected off the objects (such as object 140). The ToF sensor 110 includes a light source 112, a light receptor 114, and a distance calculator 116.

The light source 112 is configured to emit (or "transmit") light 142 in a direction of the object 140. For example, the light source 112 may include one or more illumination mechanisms including (but not limited to) lasers, light-emitting diodes (LEDs), and/or any other mechanisms capable of emitting wavelengths of light in the visible spectrum, the infrared spectrum, or the ultraviolet spectrum). The light receptor 114 may be configured to detect (or "receive) light 144 reflected back from the object 140. For example, the light receptor 114 may include an array of pixel sensors including (not limited to) photodiodes, CMOS image sensor arrays, CCD arrays, and/or any other sensors capable of detecting wavelengths of light in the visible spectrum, the infrared spectrum, or the ultraviolet spectrum. The light receptor 114 may be located adjacent to (or in close proximity of) the light source 112 to ensure that the distance traveled by the transmitted light 142 is substantially equal to the distance traveled by the reflected light 144.

The distance calculator 116 is configured to determine a distance between the ToF sensor 110 and one or more objects within the pathway of the transmitted light 142 (such as object 140) based, at least in part, on a round-trip time (RTT) of the transmitted light. For example, the distance calculator 116 may calculate the distance of the object 140 based on a difference in timing between the transmission of the transmitted light 142 and the reception of the reflected light 144 (e.g., since the speed of light is a known quantity). As described in greater detail below, many ToF sensors rely on complex trigonometric functions, which are both computationally intensive and produce relatively imprecise depth information. However, aspects of the present disclosure leverage the nature of the ToF sensor's functionality to break down the distance calculations into simple linear operations.

In some embodiments, the distance calculator 116 may calculate the distance of the object 140 in an iterative manner. For example, the distance calculator 116 may first determine a general phase shift between the transmitted light 142 and the reflected light 144. The distance calculator 116 may then fine-tune the distance calculation based on a linear relationship between the general phase shift and the actual timing relationship between the transmitted light 142 and the reflected light 144. By iteratively calculating the timing relationship (e.g., phase shift) between the transmitted light 142 and the reflected light 144, the distance calculator 116 may determine the distance of the object 140 without use of complex trigonometric functions. Accordingly, the ToF sensor 110 of the present embodiments may determine the distance of the object 140 in a manner that is less computationally intensive than that of conventional ToF sensors while also producing more accurate results (e.g., as described in greater detail below).

Figure 2:
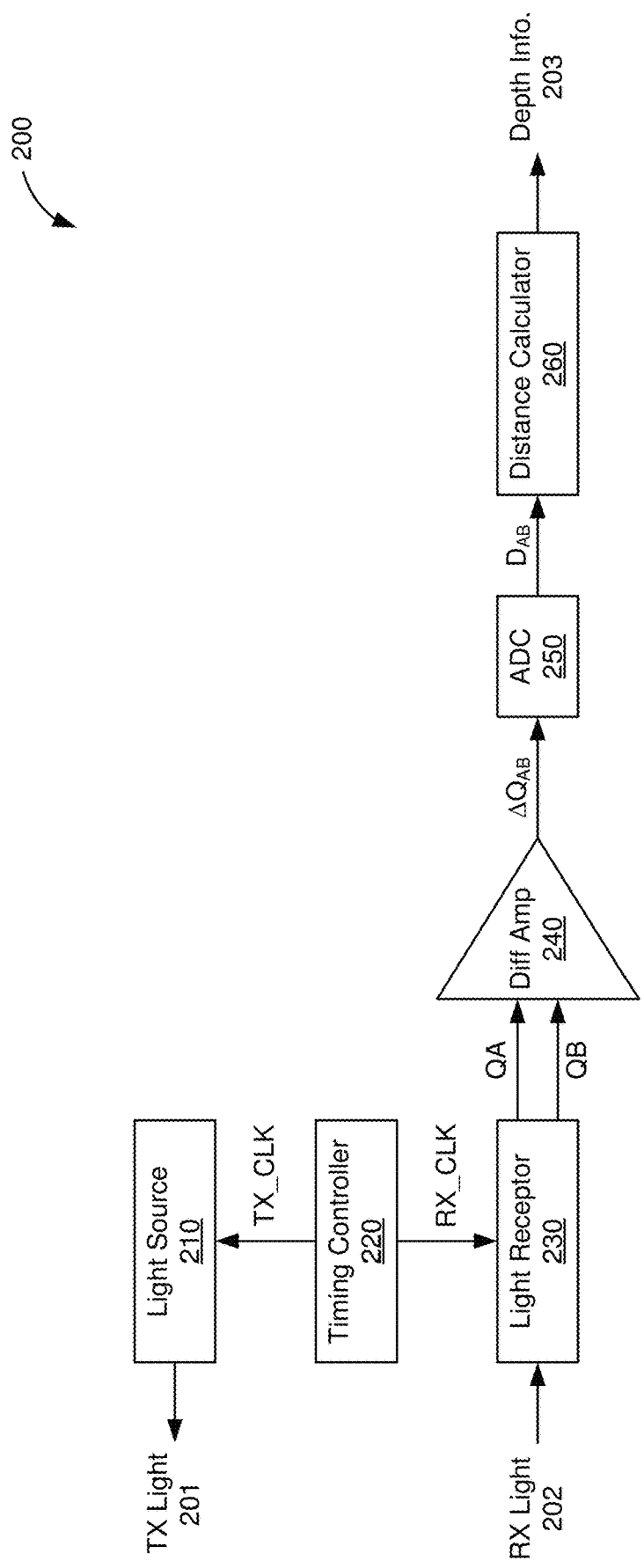
FIG. 2 shows a block diagram of a ToF sensor, in accordance with some embodiments.

FIG. 2 shows a block diagram of a ToF sensor 200, in accordance with some embodiments. The ToF sensor 200 may be an example embodiment of the ToF sensor 110 of FIG. 1. Thus, the ToF sensor 200 may be configured to determine depth information of nearby objects by illuminating the sensor's field of view and measuring the light reflected off the objects.

The ToF sensor 200 includes a light source 210, a timing controller 220, a light receptor 230, a differential amplifier (diff amp) 240, an analog-to-digital converter (ADC) 250, and a distance calculator 260. The light source 210 may be an example embodiment of the light source 112 of FIG. 1. Thus, the light source 210 may be configured to emit or transmit (TX) light 201 in a direction of the sensor's field of view. The light receptor 230 may be an example embodiment of the light receptor 114 of FIG. 1. Thus, the light receptor 230 may be configured to detect or receive (RX) light 202 reflected back from one or more objects in the sensor's field of view (e.g., in the path of the TX light 201). The timing controller 220 may control a timing of the light source 210 and the light receptor 230 via control signals TX_CLK and RX_CLK, respectively.

In operation, the timing controller 220 may repeatedly strobe the light source 210 (e.g., by driving TX_CLK) to periodically transmit "bursts" of TX light 201 in rapid succession. At least some of the transmitted light 201 may be reflected by an object (such as object 140 of FIG. 1) and returned to the ToF sensor 200 as the RX light 201. The timing controller 220 may further activate or turn "on" the light receptor 230 (e.g., by driving RX_CLK) to detect and/or capture the RX light 202. In some implementations, the light receptor 230 may comprise an array of optical sensing elements or "pixels" operated (electrically) in a global shutter configuration. In other words, when the light receptor 230 is activated (e.g., the global shutter is "open") the pixels in the array are concurrently exposed to the RX light 202. When the global shutter is open, the pixels are exposed to When the light receptor 230 is deactivated (e.g., the global shutter is "closed") the pixels in the array are concurrently disabled from receiving any subsequent RX light 202.

During a given exposure cycle (e.g., while the global shutter is open), the light receptor 230 converts the RX light 202 to an electric charge or current that is stored on one or more storage elements within each pixel of the array. The charge may be accumulated over a number of exposure cycles so that a sufficiently high voltage differential can be read from the storage elements. When the global shutter is open, the pixels may be exposed to background illumination in addition to reflections of the TX light 201. Thus, to prevent overexposure of the pixels to background illumination, the timing controller 220 may lock the timing of the exposure cycles to coincide with the timing of the bursts of TX light 201 (e.g., as described in greater detail with respect to FIG. 3).

Figure 3:
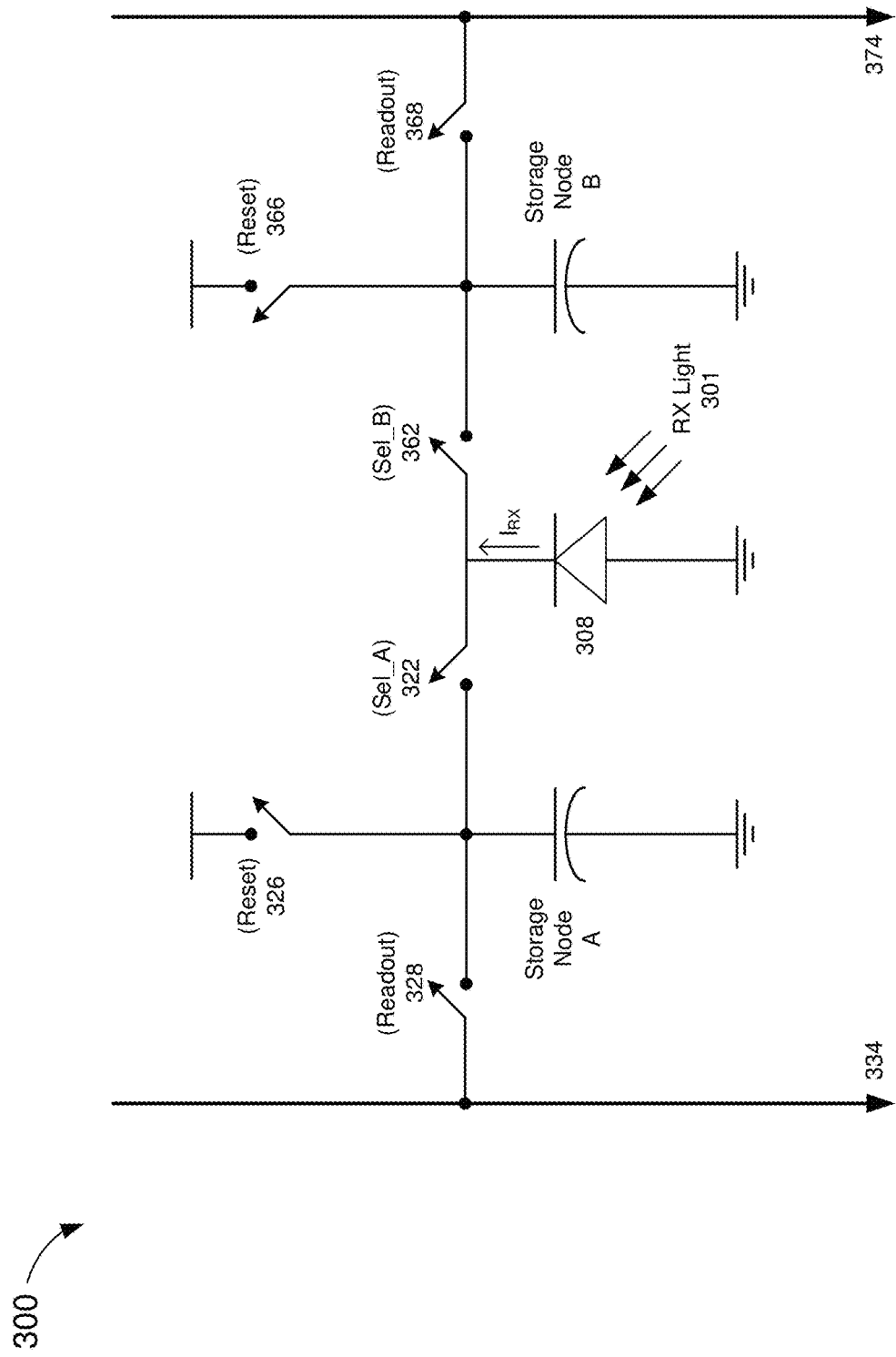
FIG. 3 shows an example pixel structure for a light receptor of a ToF sensor.

FIG. 3 shows an example pixel structure 300 for a light receptor of a ToF sensor. For example, the pixel structure 300 may be an embodiment of one of a plurality of similar or identical pixel structures contained within the light receptor 230. The pixel structure 300 includes a photodiode 308, a first storage node (A), and a second storage node (B). In the example of FIG. 3, the storage nodes A and B are depicted as capacitors. However, in actual implementations, the storage nodes A and B may be implemented using any circuitry capable of storing electric charge.

The photodiode 308 converts incident (RX) light 301 to an electrical current (IRx). With reference for example to FIG. 2, the RX light 301 may correspond to the RX light 202 received by the light receptor 230. The photodiode 308 is switchably coupled to the storage nodes A and B via respective switches 322 and 362. Switch 322 may be controlled by a first select signal (Sel_A) and switch 362 may be controlled by a second select signal (Sel_B). In some implementations, only one of the switches 322 or 362 may be closed at any given time. More specifically, one of the switches 322 or 362 may be closed any time the light receptor is activated (e.g., where the closing of one of the switches 322 or 362 effectively "opens" the global shutter) to allow an accumulation of charge on a corresponding one of the storage nodes A or B. When the light receptor is deactivated, both of the switches 322 and 362 are open (e.g., where the opening of both switches 322 and 362 effectively "closes" the global shutter) to stop the accumulation of charge on the storage nodes A and B. The timing of the switches 322 and 362 may be controlled by a timing controller (such as the timing controller 220 of FIG. 2).

Figure 4:
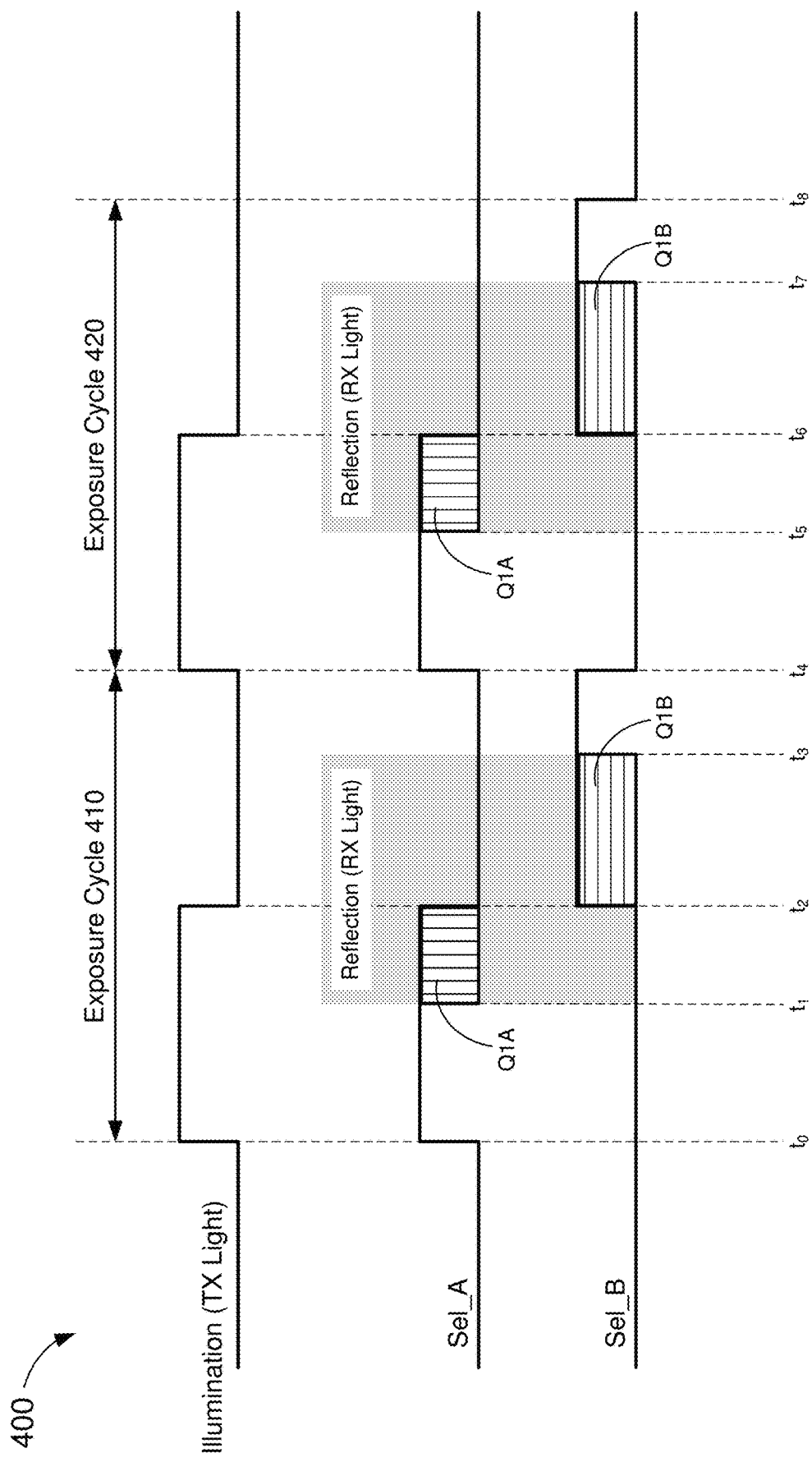
FIG. 4 is a timing diagram depicting an example charge accumulation operation for a ToF sensor.

An example operation of the pixel structure 300 is described with respect to the timing diagram 400 of FIG. 4. A pulse of light (e.g., TX light 201) is transmitted from times $t_0$ to $t_2$ and a reflection of the transmitted light (e.g., RX light 202) is returned from times $t_1$ to $t_3$. In the example of FIG. 4, the exposure cycles are locked in phase with the pulses of light. Thus, a first exposure cycle 410 is initiated at time $t_0$ and lasts for the duration of a pulse period (e.g., from times $t_0$ to $t_4$). The first select signal Sel_A is asserted at time $t_0$ and remains asserted for a portion (e.g., half) of the first exposure cycle 410 (e.g., until time $t_2$). While Sel_A is asserted, switch 322 is closed, causing charge to accumulate on storage node A. It is noted that, because the reflected light is returned between times $t_1$ and $t_3$, a portion of the charge accumulated on storage node A (depicted as "Q1A" in FIG. 4) between times $t_1$ and $t_2$ may be attributed to the reflected portion of the transmitted light, with that portion being proportional to the length of the time period between times $t_1$ and $t_2$.

Then, at time $t_2$, the first select signal Sel_A is deasserted while the second select signal Sel_B is asserted and remains asserted for the remainder (e.g., half) of the first exposure cycle 410 (e.g., until time $t_4$). While Sel_B is asserted, switch 362 is closed, causing charge to accumulate on storage node B. It is noted that, because the reflected light is returned between times $t_1$ and $t_3$, a portion of the charge accumulated on storage node B (depicted as "Q1B" in FIG. 4) between times $t_2$ and $t_3$ may be attributed to the reflected portion of the transmitted light, with that portion being proportional to the length of the time period between times $t_2$ and $t_3$. The second select signal Sel_B is subsequently deasserted, at time $t_4$, coinciding with the end of the first exposure cycle 410.

A second pulse of light is transmitted from times $t_0$ to $t_6$ and a reflection of the transmitted light is returned from times $t_5$ to $t_7$. Thus, a second exposure cycle 420 is initiated at time $t_0$ and lasts for the duration of a pulse period (e.g., from times $t_0$ to $t_8$). The first select signal Sel_A is asserted at time to and remains asserted for a portion (e.g., half) of the second exposure cycle 420 (e.g., until time $t_6$). While Sel_A is asserted, switch 322 is closed, causing additional charge to accumulate on storage node A. It is noted that, because the reflected light is returned between times $t_5$ and $t_7$, a portion of the charge accumulated on storage node A between times $t_5$ and $t_7$ may be attributed to the reflected portion of the transmitted light, with that portion being proportional to the length of the time period between times $t_5$ and $t_7$.

Then, at time $t_6$, the first select signal Sel_A is deasserted while the second select signal Sel_B is asserted and remains asserted for the remainder (e.g., half) of the second exposure cycle 420 (e.g., until time $t_8$). While Sel_B is asserted, switch 362 is closed, causing additional charge to accumulate on storage node B. It is noted that, because the reflected light is returned between times $t_5$ and $t_7$, a portion of the charge accumulated on storage node B between times $t_6$ and $t_7$ may be attributed to the reflected portion of the transmitted light, with that portion being proportional to the length of the time period between times $t_6$ and $t_7$. The second select signal Sel_B is subsequently deasserted, at time $t_8$, coinciding with the end of the second exposure cycle 420.

The operations described with respect to FIG. 4 may be repeated over a threshold number (N) of exposure cycles (e.g., until a sufficient amount of charge has accumulated on the storage nodes A and/or B). Having achieved the threshold number of exposure cycles, the select signals Sel_A and Sel_B may be deasserted (effectively decoupling the storage nodes A and B from the photodiode 308) and the charges stored on each of the storage nodes A and B may be read out (e.g., as a "frame" of data) via a pair of signal lines 334 and 374. In the example of FIG. 3, the signal lines 334 and 374 are coupled to storage nodes A and B via "readout" switches 328 and 368, respectively. During a charge readout operation, the readout switches 328 and 368 may be closed. As a result, the charges accumulated on the storage nodes 334 and 374 may be read out via the signal lines 334 and 374, respectively, to a differential amplifier (such as the diff amp 240 of FIG. 2). The pixel structure 300 may then be reset, for example, by opening the readout switches 328 and 368 and closing a pair of "reset" switches 326 and 366. Specifically, the reset switches 326 and 366 may remain closed until the charges on the storage nodes A and B return to a reset (e.g., initialized) state.

Referring back to FIG. 2, a frame of differential data (QA and QB) may be read out from the light receptor 230 (e.g., from a plurality of pixels similar, if not identical, to the pixel structure 300 of FIG. 3) after N sensing cycles have completed. The first component of the differential data (QA) may correspond to an amount of charge (or voltage) accumulated on a first storage node (e.g., storage node A of FIG. 3) across each of the pixels in the light receptor 230. The second component of the differential data (QB) may correspond to an amount of charge (or voltage) accumulated on a second storage node (e.g., storage node B of FIG. 3) across each of the pixels in the light receptor 230.

The differential amplifier 240 receives the differential data QA and QB and outputs (e.g., amplifies) a difference ($\Delta Q_{AB}$) of the component charges QA and QB. Taking the difference between the differential data values QA and QB has the effect of cancelling out charge accumulation due to background illumination (e.g., which should be substantially equal, if not identical, on both of the storage nodes A and B). In some aspects, the ADC 250 may convert the analog difference $\Delta Q_{AB}$ to a digital value ($D_{AB}$).

The distance calculator 260 generates depth information 203 based, at least in part, on the digital value $D_{AB}$. As described above with respect to FIG. 3, the timing of the select signals Sel_A and Sel_B may be configured such that the switching between the accumulation of charge on storage node A and the accumulation of charge on storage node B occurs within a period of time during which the reflected light pulse is expected to return to the light receptor. Accordingly, the proportion of collected charge on each of the storage nodes A and B may indicate the delay between the timing of the illumination (e.g., transmission of the TX light) and the reflection (e.g., reception of the RX light). With reference for example to FIG. 4, the amount of charge accumulated on node B will be greater than the amount of charge accumulated on node A after any number of exposure cycles have occurred. This difference in accumulated charge may indicate that the reflected light arrived later than expected, and thus the object reflecting the light may be further away.

It is noted, however, that other factors (such as background illumination, varying reflectivity of objects, and the like) may introduce errors into the accumulation of charge on one or more of the storage nodes A or B and thus affect the accuracy of the distance calculation. To mitigate such errors, the timing controller 220 may vary the timing relationship between activation of the light source (e.g., to transmit TX light 201) and activation of the light receptor 230 (e.g., to capture RX light 202). For example, the RX_CLK may be delayed relative to the TX_CLK so that each exposure cycle of the light receptor 230 trails a corresponding pulse of light transmitted by the light source 210 by a phase delay (θ). More specifically, the phase delay θ may be applied to the light receptor 230 when acquiring a subsequent frame of differential data QA and QB.

Figure 5:
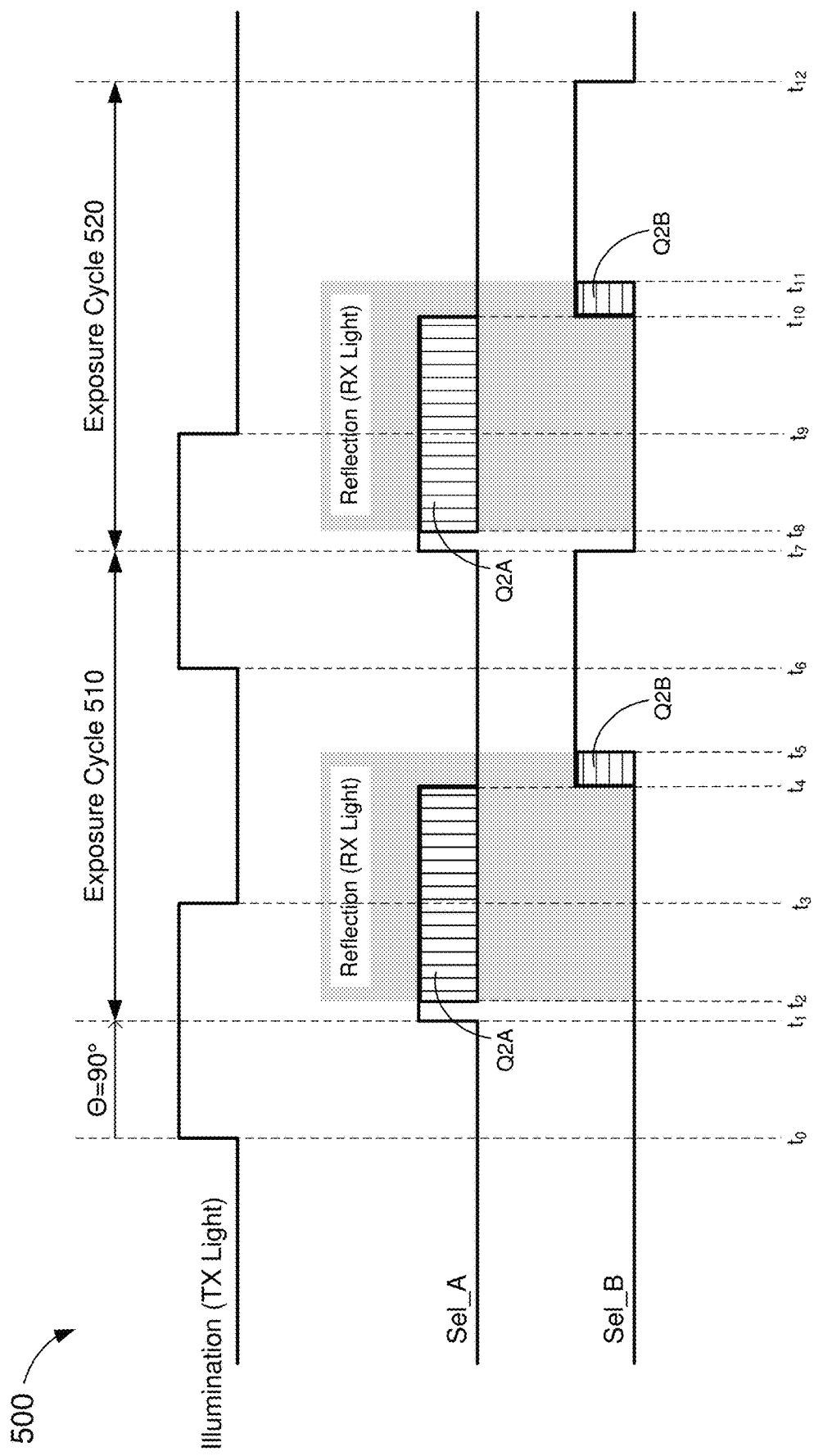
FIG. 5 is a timing diagram depicting another example charge accumulation operation for a ToF sensor.

An example operation for acquiring a phase-delayed frame is described with respect to the timing diagram 500 of FIG. 5 and the pixel structure 300 of FIG. 3. A pulse of light (e.g., TX light 201) is transmitted from times $t_0$ to $t_3$ and a reflection of the transmitted light (e.g., RX light 202) is returned from times $t_2$ to $t_5$. In the example of FIG. 5, the exposure cycles are phase-shifted by 90° relative to the pulses of light (e.g., θ=90°). Thus, a first exposure cycle 510 is initiated at time $t_1$ and lasts for the duration of a pulse period (e.g., from times $t_1$ to $t_7$). The first select signal Sel_A is asserted at time $t_1$ and remains asserted for a portion (e.g., half) of the first exposure cycle 510 (e.g., until time $t_4$). While Sel_A is asserted, switch 322 is closed, causing charge to accumulate on storage node A. It is noted that, because the reflected light is returned between times $t_2$ and $t_5$, a portion of the charge accumulated on storage node A (depicted as "Q2A" in FIG. 5) between times $t_2$ and $t_4$ may be attributed to the reflected portion of the transmitted light, with that portion being proportional to the length of the time period between times $t_2$ and $t_4$.

Then, at time $t_4$, the first select signal Sel_A is deasserted while the second select signal Sel_B is asserted and remains asserted for the remainder (e.g., half) of the first exposure cycle 510 (e.g., until time $t_7$). While Sel_B is asserted, switch 362 is closed, causing charge to accumulate on storage node B. It is noted that, because the reflected light is returned between times $t_2$ and $t_5$, a portion of the charge accumulated on storage node B (depicted as "Q2B" in FIG. 5) between times $t_4$ and $t_5$ may be attributed to the reflected portion of the transmitted light, with that portion being proportional to the length of the time period between times $t_4$ and $t_5$. The second select signal Sel_B is subsequently deasserted, at time $t_7$, coinciding with the end of the first exposure cycle 510.

A second pulse of light is transmitted from times $t_6$ to $t_9$ and a reflection of the transmitted light is returned from times $t_8$ to $t_{11}$. Thus, a second exposure cycle 520 is initiated at time $t_7$ and lasts for the duration of a pulse period (e.g., from times $t_7$ to $t_{12}$). The first select signal Sel_A is asserted at time $t_7$ and remains asserted for a portion (e.g., half) of the second exposure cycle 520 (e.g., until time $t_{10}$). While Sel_A is asserted, switch 322 is closed, causing additional charge to accumulate on storage node A. It is noted that, because the reflected light is returned between times $t_8$ and $t_{11}$, a portion of the charge accumulated on storage node A between times $t_8$ and $t_{10}$ may be attributed to the reflected portion of the transmitted light, with that portion being proportional to the length of the time period between times $t_8$ and $t_{10}$.

Then, at time $t_{10}$, the first select signal Sel_A is deasserted while the second select signal Sel_B is asserted and remains asserted for the remainder (e.g., half) of the second exposure cycle 520 (e.g., until time $t_{12}$). While Sel_B is asserted, switch 362 is closed, causing additional charge to accumulate on storage node B. It is noted that, because the reflected light is returned between times $t_8$ and $t_{11}$, a portion of the charge accumulated on storage node B between times $t_{10}$ and $t_{11}$ may be attributed to the reflected portion of the transmitted light, with that portion being proportional to the length of the time period between times $t_{10}$ and $t_{11}$. The second select signal Sel_B is subsequently deasserted, at time $t_{12}$, coinciding with the end of the second exposure cycle 520.

Referring back to FIG. 2, a second frame of differential data QA and QB may be read out from the light receptor 230 after another N sensing cycles have completed. The differential amplifier 240 receives the differential data QA and QB associated with the second frame and amplifies their difference $\Delta Q_{AB}$. The ADC 250 may convert the analog difference $\Delta Q_{AB}$ to a digital value $D_{AB}$, and the distance calculator 260 may generate the depth information 203 based on the digital values $D_{AB}$ associated with the first frame and the second frame. For purposes of distinction, the first frame of data will be referred to hereinafter as Q1A and Q1B (e.g., as shown in FIG. 5, where $\theta=0°$) and the second frame of data will be referred to as Q2A and Q2B (e.g., as shown in FIG. 5, where $\theta=90°$). In some implementations, the distance calculator 260 may calculate the distance between an object and the ToF sensor 200 according to the following equation:

$$\text{distance} = K\phi$$

where K is a constant related to the speed of light and $\phi$ represents the phase shift of the RX light 202 relative to the TX light 201. In some implementations, the phase shift $\phi$ may be calculated according to the following equation:

$$\phi = a\tan\left(\frac{Q2A - Q2B}{Q1A - Q1B}\right)$$

As described above, each of the difference operations Q2A−Q2B and Q1A−Q1B may be computed by the differential amplifier 240 in generating the difference values $\Delta Q_{AB}$. It is further noted that computing the quotient of the difference values has the effect of normalizing for variations in system gain (e.g., variations in the reflectivity of objects in each frame). Due to the 90° phase shift between the timing of the first frame and second frame, the denominator of the phase-shift equation ($\phi$) may be referred to as the in-phase or "real" component (e.g., Real=Q1A−Q1B) while the numerator may be referred to as the quadrature or "imaginary" component (e.g., Imaginary=Q2A−Q2B).

It is noted that the phase shift $\phi$ is representative of the delay (or RTT) between the RX light 202 and the TX light 201 and thus the distance between the ToF sensor 200 and an object in the sensor's field of view. Thus, many ToF sensors attempt to calculate the distance to the object by solving the arctangent function (e.g., which involves complex trigonometric operations). However, due to cost considerations, the illumination waveform (e.g., the TX light 201) is typically a square wave, rather than a sinusoid. Thus, the arctangent function can only approximate the actual phase shift $\phi$. As a result, a certain amount of phase error is introduced in the phase-shift calculation using the arctangent function above. Thus, calculating the phase shift $\phi$ using the arctangent function above may be computationally intensive while also yielding only approximately accurate results.

Figure 6:
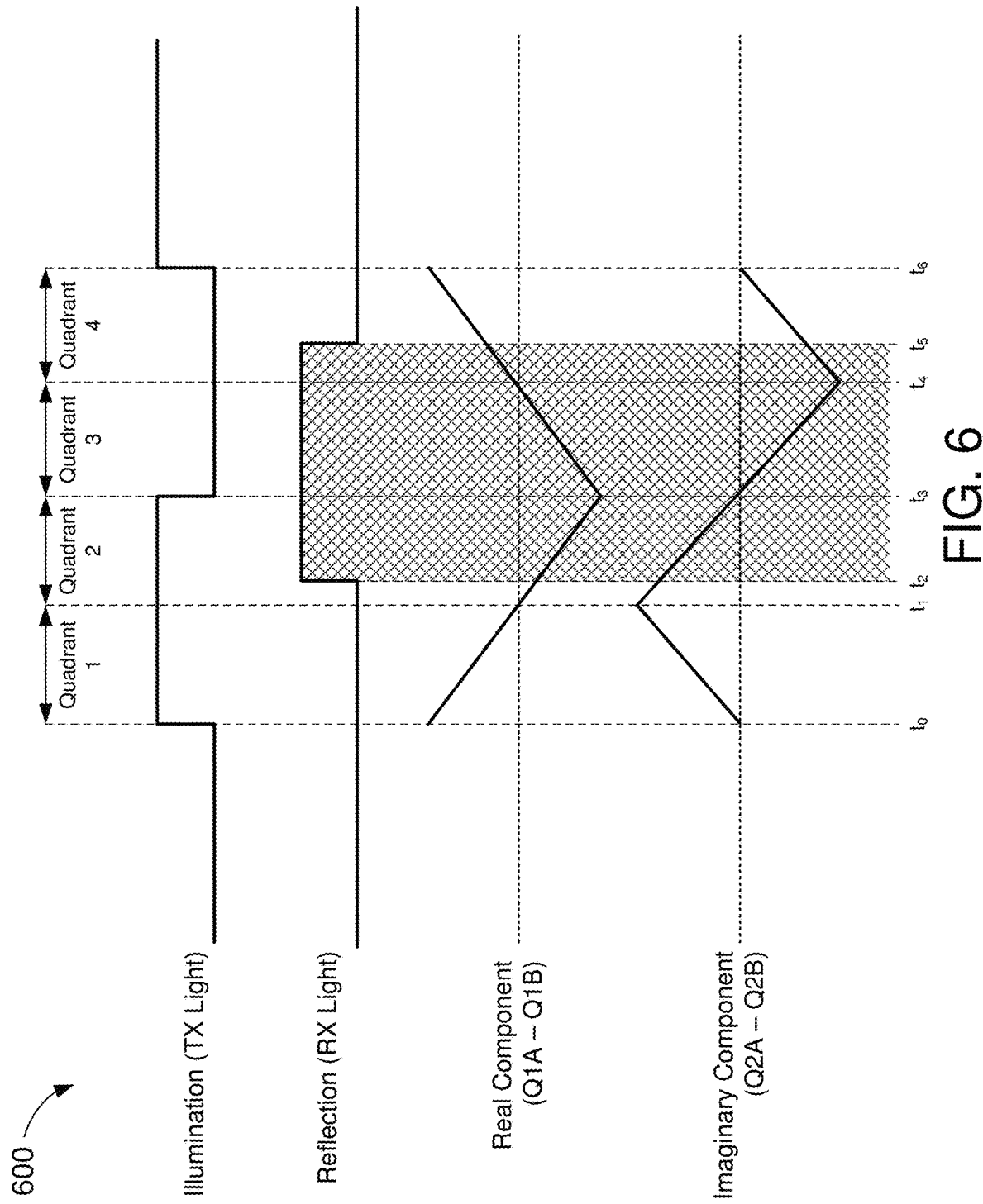
FIG. 6 is a timing diagram depicting example changes in the real and imaginary components of sensor data acquired by a ToF sensor.

Aspects of the present disclosure recognize that the phase shift $\phi$ may be derived more accurately by inspecting the waveforms for the real and imaginary components of the sensor data based on a square-wave illumination profile (e.g., in lieu of solving the arctangent function above). With reference for example to the timing diagram 600 of FIG. 6, a pulse of light (e.g., TX light 201) is transmitted from times $t_0$ to $t_3$ and a reflection of the transmitted light (e.g., RX light 202) is returned from times $t_2$ to $t_5$. In the example of FIG. 6, each illumination period (e.g., from times $t_0$ to $t_6$) is subdivided into four "quadrants." For example, the first quadrant may coincide with a first quarter-phase of the illumination period (e.g., from times $t_0$ to $t_1$), the second quadrant may coincide with a second quarter-phase of the illumination period (e.g., from times $t_1$ to $t_3$), the third quadrant may coincide with a third quarter-phase of the illumination period (e.g., from times $t_3$ to $t_4$), and the fourth quadrant may coincide with a fourth quarter-phase of the illumination period (e.g., from times $t_0$ to $t_6$).

FIG. 6 further illustrates expected values of the real (Q1A−Q1B) and imaginary (Q2A−Q2B) components of the sensor data (e.g., output by the diff amp 240 of FIG. 2) as a function of the time at which the reflected light pulse begins to arrive. For example, if the reflecting object is right in front of the ToF sensor (e.g., 0 distance away), the reflected light is expected to begin arriving immediately (e.g., at time $t_0$).

Since the exposure cycle of the real component of the sensor data is in-phase with the transmitted light, the real component is expected to be at a maximum at time $t_0$. Since the exposure cycle of the imaginary component of the sensor data is 90° out of phase with the transmitted light, the imaginary component is expected to be zero at time $t_0$.

When the reflected light begins to arrive at time $t_1$, the reflecting object is expected to be located at a distance corresponding to a 90° phase shift relative to the timing of the transmitted light. Thus, the real component is expected to be zero and the imaginary component is expected to be at a maximum at time $t_1$. When the reflected light begins to arrive at time $t_3$, the reflecting object is expected to be located at a distance corresponding to a 180° phase shift relative to the timing of the transmitted light. Thus, the real component is expected to be at a minimum and the imaginary component is expected to be zero at time $t_3$. When the reflected light begins to arrive at time $t_4$, the reflecting object is expected to be located at a distance corresponding to a 270° phase shift relative to the timing of the transmitted light. Thus, the real component is expected to be zero and the imaginary component is expected to be at a minimum at time $t_4$.

It is noted that, for reflected pulses for which at least a portion of the arrival period is at or beyond time $t_6$, at least a portion of the accumulated charge in a given exposure cycle may be attributed to reflected light from a pulse generated in the previous illumination period. For example, if a reflected light pulse begins to arrive at the light receptor at or around time $t_5$ in FIG. 6, the duration of the arriving pulse will be expected to extend beyond time $t_6$. As a result, within any given exposure cycle, a portion of the charge accumulated as Q1A and possibly Q2A will be attributed to reflected light from a light pulse generated during the previous illumination period. It should be understood, however, that this does not modify the expected values for the real and imaginary data components as illustrated in FIG. 6. Rather, the overlap of reflected light pulses across exposure boundaries is a key factor in attaining the expected data components as illustrated in FIG. 6.

As shown in FIG. 6, the real component of the sensor data and the imaginary component of the sensor data are each expected to vary linearly with respect to the illumination period (e.g., from times $t_0$ to $t_6$). In the first quadrant, the real component decreases linearly from a maximum value to zero while the imaginary component increases linearly from zero to a maximum value. In the second quadrant, the real component decreases linearly from zero to a minimum value while the imaginary component decreases linearly from a maximum value to zero. In the third quadrant, the real component increases linearly from a minimum value to zero while the imaginary component decreases linearly from zero a minimum value. In the fourth quadrant, the real component increases linearly from zero to a maximum value while the imaginary component increases linearly from a minimum value to zero.

Aspects of the present disclosure recognize that each quadrant of the illumination period can be uniquely identified based on the signs (e.g., positive or negative) of the real and imaginary components of the sensor data. For example, the first quadrant coincides with a positive real component and a positive imaginary component, the second quadrant coincides with a negative real component and a positive imaginary component, the third quadrant coincides with a negative real component and a negative imaginary component, and the fourth quadrant coincides with a positive real component and a negative imaginary component.

Thus, in some embodiments, the distance calculator 260 may be configured to calculate the phase shift $\phi$ by first identifying the quadrant associated with the received sensor data (e.g., corresponding to the reflection) and performing a linear phase calculation that is specific to the identified quadrant. As shown in FIG. 6, each quadrant may be used to describe a "general" phase shift (e.g., 0°, 90°, 180°, or 270°) between the illumination and the reflection. Within each quadrant, the actual phase shift can be computed more linearly based on the real component of the sensor data and the imaginary component of the sensor data.

If the distance calculator 260 determines that the reflection falls within the first quadrant (e.g., Real >0 and Imaginary >0), the distance calculator 260 may calculate the phase shift $\phi_0$ (relative to the start of quadrant 1) according to the following algebraic expression:

$$\phi_0 = \frac{\text{Imaginary}}{\text{Imaginary} + \text{Real}}$$

And the overall phase shift $\phi$ (relative to the start of the illumination period) may be calculated as:

$$\phi = \phi_0$$

If the distance calculator 260 determines that the reflection falls within the second quadrant (e.g., Real <0 and Imaginary >0), the distance calculator 260 may calculate the phase shift $\phi_1$ (relative to the start of quadrant 2) according to the following algebraic expression:

$$\phi_1 = \frac{-\text{Real}}{\text{Imaginary} - \text{Real}}$$

And the overall phase shift $\phi$ (relative to the start of the illumination period) may be calculated as:

$$\phi = \phi_1 + 90°$$

If the distance calculator 260 determines that the reflection falls within the third quadrant (e.g., Real <0 and Imaginary <0), the distance calculator 260 may calculate the phase shift $\phi_2$ (relative to the start of quadrant 3) according to the following algebraic expression:

$$\phi_2 = \frac{-\text{Imaginary}}{-\text{Imaginary} - \text{Real}}$$

And the overall phase shift $\phi$ (relative to the start of the illumination period) may be calculated as:

$$\phi = \phi_2 + 180°$$

If the distance calculator 260 determines that the reflection falls within the fourth quadrant (e.g., Real >0 and Imaginary <0), the distance calculator 260 may calculate the phase shift $\phi_3$ (relative to the start of quadrant 4) according to the following algebraic expression:

$$\phi_3 = \frac{\text{Real}}{\text{Real} - \text{Imaginary}}$$

And the overall phase shift φ (relative to the start of the illumination period) may be calculated as:

$$\phi = \phi_3 + 270°$$

In the specific example of FIG. 6, the reflection is detected at time $t_2$, which falls within with the second quadrant of the illumination period. The distance calculator 260 may identify the quadrant associated with the reflection by comparing the real and imaginary components of the sensor data.

Specifically, the distance calculator 260 may determine that the reflection coincides with the second quadrant upon determining that the real component of the sensor data (e.g., Q1A–Q1B) is negative while the imaginary component of the sensor data (e.g., Q2A–Q2B) is positive. The distance calculator 260 may then calculate a quadrant-specific or "incremental" phase shift (e.g., $\phi_1$) to determine the overall phase shift φ of the reflection (e.g., $\phi = \phi_1 + 90°$).

As described above, the distance calculator 260 may determine the distance of objects within the sensor's field of view in an iterative manner. For example, the distance calculator 260 may first determine a general phase shift between the illumination and the reflection (e.g., by identifying which quadrant the reflection falls under). The distance calculator 260 may then fine-tune the distance calculation using a linear operation that is specific to the identified quadrant (e.g., $\phi_0$, $\phi_1$, $\phi_2$, or $\phi_3$). By iteratively calculating the phase shift φ, the distance calculator 260 may determine the distance of objects in the sensor's field of view without use of complex trigonometric functions. Accordingly, the ToF sensor 200 may determine the distance of objects in a manner that is less computationally intensive than that of conventional ToF sensors while also producing more accurate results.

It is noted that the general phase shift depends on the phase relationship (e.g., offset) between exposure cycles of different frames of sensor data. In the example of FIG. 6, the exposure cycle used to acquire the second frame (Q2A–Q2B) is offset by 90° relative to the exposure cycle used to acquire the first frame (Q1A–Q1B). Since this phase offset represents a quarter of the total illumination period (e.g., from times $t_0$ to $t_6$), each general phase shift is said to coincide with a different quadrant of the illumination period. In some embodiments, the illumination period may be subdivided into fewer or more segments (rather than quadrants) than those depicted in FIG. 6, depending on the phase relationship between the different exposure cycles, where each general phase shift corresponds to a different one of those segments.

Figure 7:
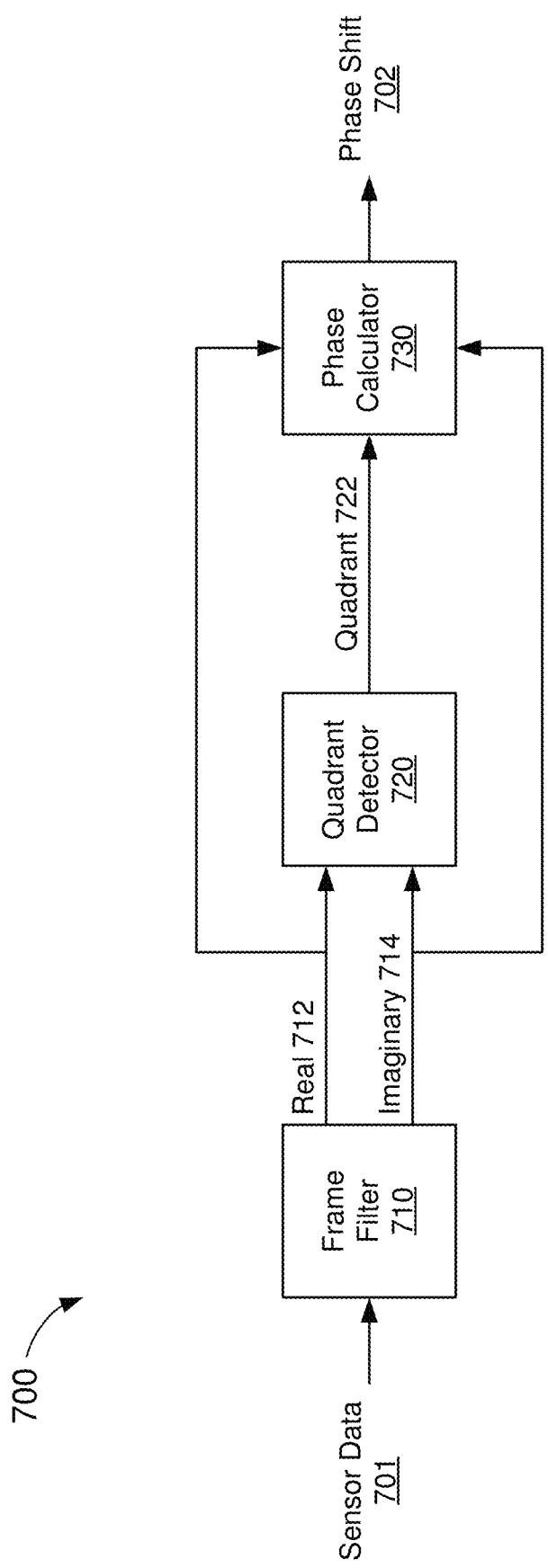
FIG. 7 is a block diagram of a distance calculator for a ToF sensor, in accordance with some embodiments.

FIG. 7 is a block diagram of a distance calculator 700 for a ToF sensor, in accordance with some embodiments. The distance calculator 700 may be an example embodiment of the distance calculator 260 of FIG. 2. Thus, the distance calculator 700 may be configured to generate depth information about an object in the sensor's field of view based on sensor data received from one or more light receptors (such as the light receptor 230 of FIG. 2). The distance calculator 700 includes a frame filter 710, a quadrant detector 720, and a phase calculator 730.

The frame filter 710 may receive two or more frames of sensor data 701 from one or more light receptors (not shown for simplicity) and may filter or separate the received frames into a real component 712 and an imaginary component 714. As described above with respect to FIGS. 2 and 3, the sensor data 701 may indicate an amount of charge accumulated on the storage nodes A and B of each pixel of a corresponding light receptor. In some aspects, the sensor data 701 may represent a difference between the charges accumulated on the different storage nodes (e.g., $\Delta Q_{AB}$). In some other aspects, the sensor data 701 may be a digital representation of the difference in charge (e.g., $D_{AB}$). As described above with respect to FIGS. 3-6, the real component 712 may correspond to a first frame of sensor data 701 (e.g., Q1A–Q1B) and the imaginary component 714 may correspond to a second frame of sensor data 701 (e.g., Q2A–Q2B), where the sensing cycle of the second frame is offset in phase (e.g., by 90°) relative to the sensing cycle of the first frame. Thus, in some embodiments, the frame filter 710 may separate the real component 712 from the imaginary component 714 based, at least in part, on an order in which the frames of sensor data 701 arrive.

Although the example embodiments have been described with respect to two frames of sensor data 701 (e.g., having a 90° phase offset between sensing cycles), it is noted that the present embodiments may be applied to any number of frames (e.g., with any number of phase offsets). For example, in some implementations, a ToF sensor may use four frames of sensor data to calculate the distances of objects in the sensor's field of view. More specifically, the sensing cycles of the second, third, and fourth frames may have phase offsets of 90°, 180°, and 270°, respectively, relative to the sensing cycle of the first frame. For this implementation, the frame filter 710 may subtract the third frame of sensor data (e.g., with 180° offset) from the first frame of sensor data (e.g., with 0° offset) to generate the real component 712, and may subtract the fourth frame of sensor data (e.g., with 270° offset) from the second frame of sensor data (e.g., with 90° offset) to generate the imaginary component 714. It is noted that, combining additional frames of sensor data may help mitigate manufacturing differences between the storage nodes A and B associated with each pixel.

The quadrant detector 720 receives the real and imaginary components 712 and 714 and identifies a quadrant 722 associated with the reflection based on the sensor data components 712 and 714. As described above with respect to FIG. 6, the quadrant 722 represents a general timing relationship or phase shift (e.g., 0°, 90°, 180°, or 270°) between the illumination (e.g., TX light) and the reflection (e.g., RX light). In some embodiments, the quadrant detector 720 may identify the appropriate quadrant 722 based on the signs (e.g., positive or negative) of the real and imaginary components 712 and 714. The sign combinations associated with each quadrant are summarized in Table 1, below.

TABLE 1

| Real Component 712 | Imaginary Component 714 | Quadrant 722 |
| --- | --- | --- |
| Positive | Positive | 1 |
| Negative | Positive | 2 |
| Negative | Negative | 3 |
| Positive | Negative | 4 |

The phase calculator 730 receives the quadrant information 722 from the quadrant detector 720, as well as the real and imaginary components 712 and 714 from the frame filter 710, and calculates an actual (e.g., more precise) phase shift 702 of the reflection relative to the illumination. As described above with respect to FIG. 6, the phase calculator 730 may calculate an incremental phase shift (e.g., $\phi_0$, $\phi_1$, $\phi_2$, or $\phi_3$) as a linear function of the real and imaginary components 712 and 714. The incremental phase shift indicates an offset relative to the start of the corresponding quadrant. Thus, the phase calculator 730 may determine the actual phase shift 702 by combining the quadrant information 722 (e.g., corresponding to a general phase shift of 0°, 90°, 180°, or 270°) with the incremental phase shift (e.g., $\phi_0$, $\phi_1$, $\phi_2$, or $\phi_3$). The phase shift 702, and incremental phase-shift, associated with each quadrant is summarized in Table 2, below.

TABLE 2

| Quadrant | Incremental Phase Shift | Actual Phase Shift 702 |
|---|---|---|
| 1 | $\phi_0 = \dfrac{\text{Imaginary}}{\text{Imaginary} + \text{Real}}$ | $\phi = \phi_0$ |
| 2 | $\phi_1 = \dfrac{-\text{Real}}{\text{Imaginary} - \text{Real}}$ | $\phi = \phi_1 + 90°$ |
| 3 | $\phi_2 = \dfrac{-\text{Imaginary}}{-\text{Imaginary} - \text{Real}}$ | $\phi = \phi_2 + 180°$ |
| 4 | $\phi_3 = \dfrac{\text{Real}}{\text{Real} - \text{Imaginary}}$ | $\phi = \phi_3 + 270°$ |

Although not shown (for simplicity), the distance calculator 700 may include additional circuitry for converting the phase shift 702 to a distance measurement. In some aspects, the distance calculator 700 may be implemented by one or more processors (such as a processing system, a DSP, and the like). In some other aspects, the distance calculator 700 may be implemented using hardwired circuitry (e.g., logic gates, adders, subtractors, multipliers, dividers, and the like). As described above, by determining the phase shift 702 in an iterative manner (e.g., using the quadrant detector 720 to determine a general phase shift and then using the phase calculator 730 to fine-tune the phase shift), the distance calculator 700 may determine the distance of objects in a manner that is less computationally intensive and more accurate than that of many conventional ToF sensors.

Figure 8:
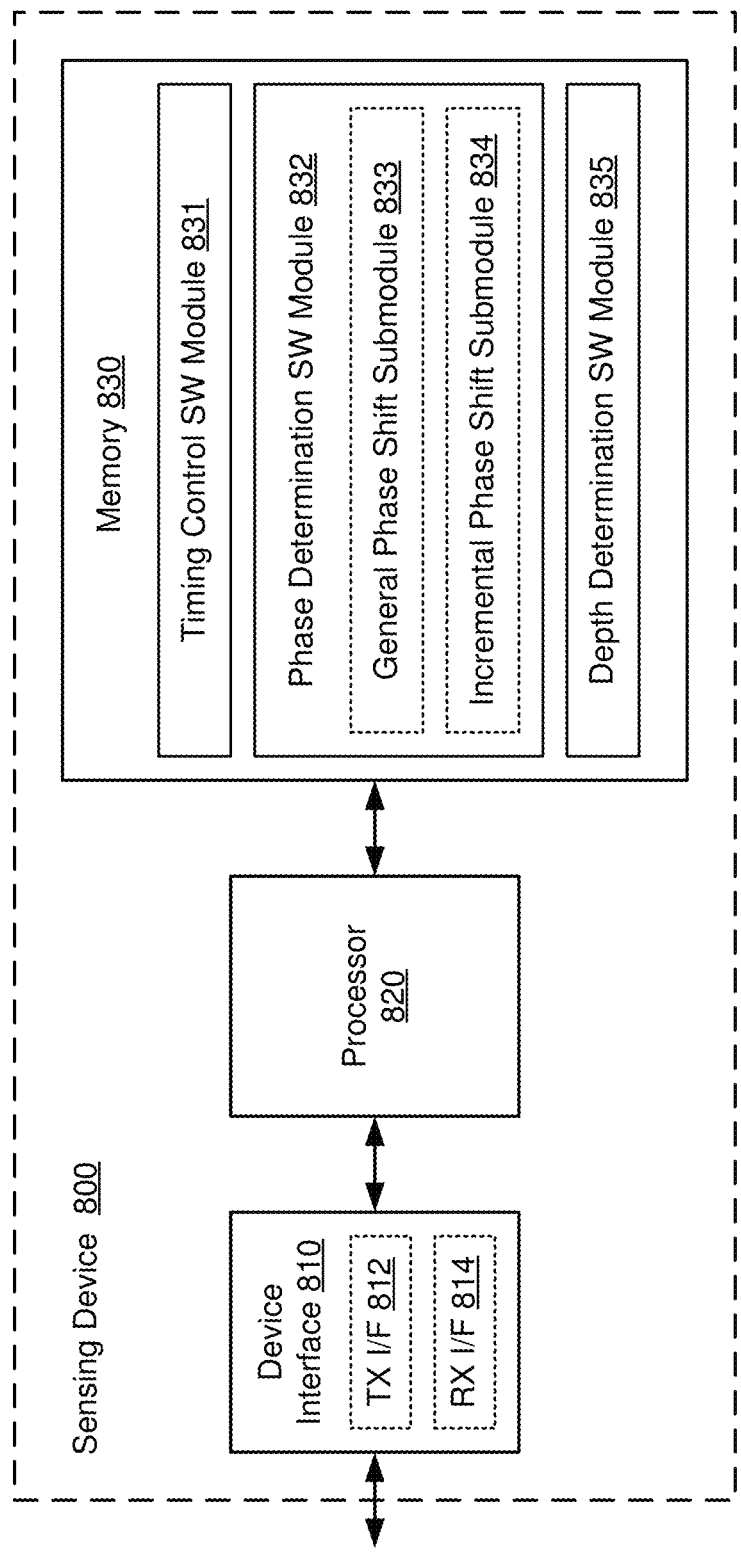
FIG. 8 shows a block diagram of a sensing device, in accordance with some embodiments.

FIG. 8 shows a block diagram of a sensing device 800, in accordance with some embodiments. The sensing device 800 may be one embodiment of the distance calculator 260 of FIG. 2 and/or the distance calculator 700 of FIG. 7. Accordingly, the sensing device 800 may be configured to generate depth information about an object in the field of view of a ToF sensor based on sensor data received from one or more light receptors (such as the light receptor 230 of FIG. 2). The sensing device 800 includes a device interface 810, a processor 820, and a memory 830.

The device interface 810 includes a transmitter (TX) interface 812 and a receiver (RX) interface 814. The TX interface 812 may be used to communicate with one or more light sources (such as the light sources 112 and/or 210 of FIGS. 1 and 2, respectively). For example, the TX interface 812 may transmit signals to the light sources to transmit light in a direction of one or more objects. The RX interface 814 may be used to communication with one or more light receptors (such as the light receptors 114 and/or 230 of FIGS. 1 and 2, respectively). For example, the RX interface 814 may transmit signals to, and receive signals from, the light receptors to capture or acquire sensor data corresponding to light reflected from the one or more objects.

The memory 830 may include a non-transitory computer-readable medium (e.g., one or more nonvolatile memory elements, such as EPROM, EEPROM, Flash memory, a hard drive, etc.) that may store at least the following software (SW) modules:

a timing control SW module 831 to control a timing between the transmission of light by the one or more light sources and the acquisition of sensor data by the one or more light receptors;

a phase determination SW module 832 to determine a phase shift of the reflected light relative to the transmitted light based on the received sensor data, the phase determination SW module 832 including:

a general phase shift submodule 833 to determine a general phase shift of the reflected light relative to the transmitted light based on a first frame of the sensor data and a second frame of the sensor data; and an incremental phase shift submodule 834 to calculate an incremental phase shift of the reflected light relative to the transmitted light based on a linear relationship between the first frame and the second frame in relation to the general phase shift; and a depth determination SW module 835 to determine depth information for one or more objects based on the phase shift of the reflected light relative to the transmitted light.

Each software module includes instructions that, when executed by the processor 820, cause the sensing device 800 to perform the corresponding functions. The non-transitory computer-readable medium of memory 830 thus includes instructions for performing all or a portion of the operations described below with respect to FIG. 9.

Processor 820 may be any suitable one or more processors capable of executing scripts or instructions of one or more software programs stored in the sensing device 800 (e.g., within memory 830). For example, the processor 820 may execute the timing control SW module 831 to control a timing between the transmission of light by the one or more light sources and the acquisition of sensor data by the one or more light receptors. The processor 820 may also execute the phase determination SW module 832 to determine a phase shift of the reflected light relative to the transmitted light based on the received sensor data. In executing the phase determination SW module 832, the processor 820 may further execute the general phase shift submodule 833 and the incremental phase shift submodule 834.

The processor 820 may execute the general phase shift submodule 833 to determine a general phase shift of the reflected light relative to the transmitted light based on a first frame of the sensor data and a second frame of the sensor data. The processor 820 may execute the incremental phase shift submodule 834 to calculate an incremental phase shift of the reflected light relative to the transmitted light based on a linear relationship between the first frame and the second frame in relation to the general phase shift. Still further, the processor 820 may execute the depth determination SW module 835 to determine depth information for one or more objects based on the phase shift of the reflected light relative to the transmitted light.

Figure 9:
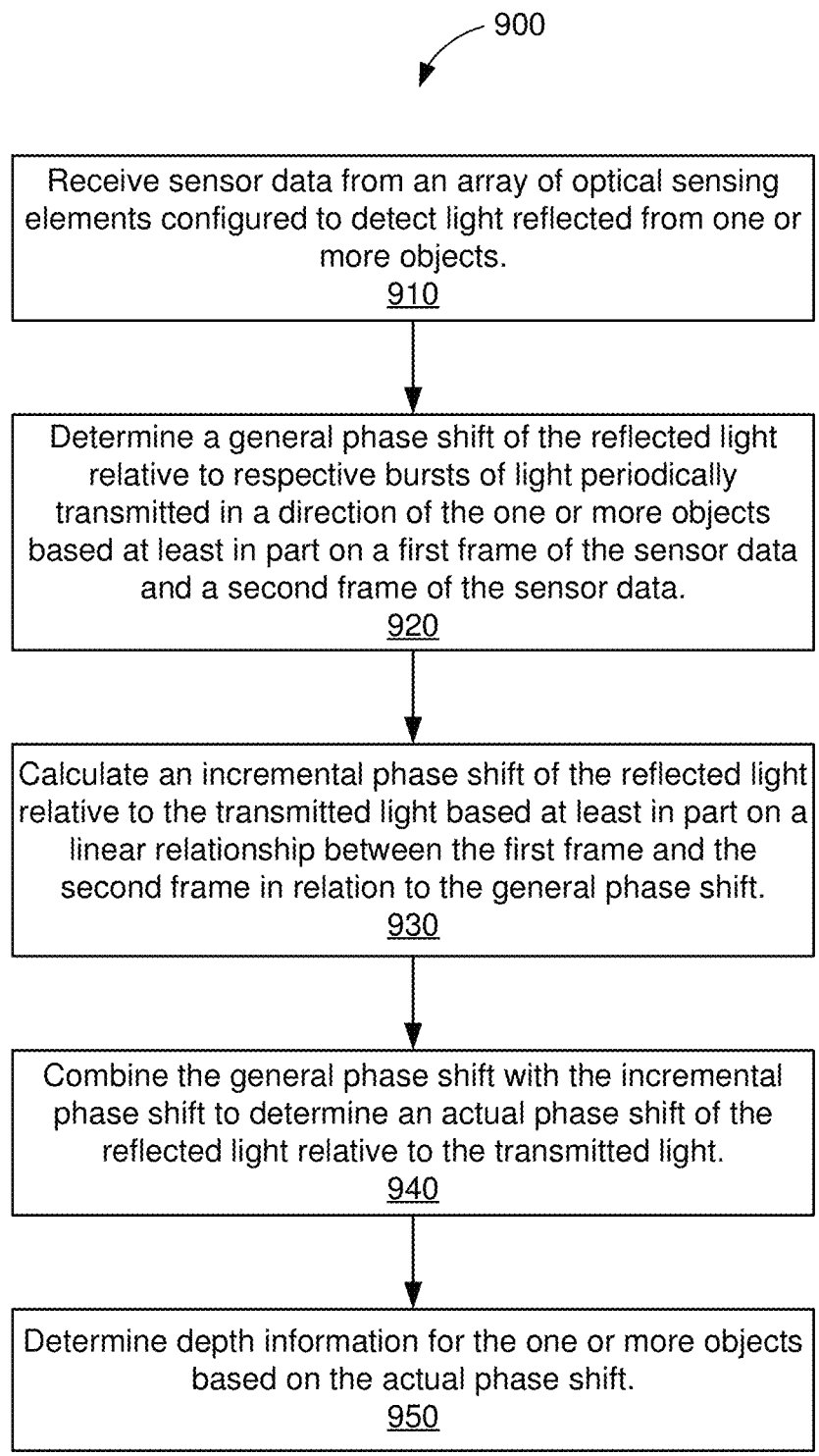
FIG. 9 shows an illustrative flowchart depicting an example operation for determining depth information, in accordance with some embodiments.

FIG. 9 shows an illustrative flowchart depicting an example operation 900 for determining depth information, in accordance with some embodiments. With reference for example to FIG. 7, the operation 900 may be performed by the distance calculator 700 to generate depth information about an object in a ToF sensor's field of view.

The distance calculator receives sensor data from an array of optical sensing elements configured to detect light reflected from one or more objects (910). For example, the frame filter 710 may receive two or more frames of sensor data 701 from one or more light receptors and may filter or separate the received frames into a real component 712 and an imaginary component 714. As described above with respect to FIGS. 2 and 3, the sensor data 701 may indicate an amount of charge accumulated on the storage nodes A and B of each pixel of a corresponding light receptor. In some aspects, the sensor data 701 may represent a difference between the charges accumulated on the different storage nodes (e.g., $\Delta Q_{AB}$). In some other aspects, the sensor data 701 may be a digital representation of the difference in charge (e.g., $D_{AB}$).

The distance calculator determines a general phase shift of the reflected light relative to respective bursts of light periodically transmitted in a direction of the one or more objects based at least in part on a first frame of the sensor data and a second frame of the sensor data (920). As described above with respect to FIGS. 3-6, the real component 712 may correspond to a first frame of sensor data 701 (e.g., Q1A–Q1B) and the imaginary component 714 may correspond to a second frame of sensor data 701 (e.g., Q2A–Q2B). The quadrant detector 720 may identify a quadrant 722 associated with the reflection based on the sensor data components 712 and 714. More specifically, the quadrant 722 represents a general timing relationship or phase shift (e.g., 0°, 90°, 180°, or 270°) between the illumination and the reflection. In some embodiments, the quadrant detector 720 may identify the appropriate quadrant 722 based on the signs of the real and imaginary components 712 and 714 (as summarized in Table 1).

The distance calculator also calculates an incremental phase shift of the reflected light relative to the transmitted light based at least in part on a linear relationship between the first frame and the second frame in relation to the general phase shift (930). As described above with respect to FIG. 6, the phase calculator 730 may calculate the incremental phase shift (e.g., $\phi_0$, $\phi_1$, $\phi_2$, or $\phi_3$) as a linear function of the real and imaginary components 712 and 714. The linear relationship used in calculating the incremental phase shift may depend on the value of the general phase shift or quadrant information 722 (as summarized in Table 2).

The distance calculator may combine the general phase shift with the incremental phase shift to determine an actual phase shift of the reflected light relative to the transmitted light (940). For example, the incremental phase shift indicates an offset relative to the start of the corresponding quadrant. Thus, the phase calculator 730 may determine the actual phase shift 702 by combining the quadrant information 722 with the incremental phase shift (as summarized in Table 2).

The distance calculator may further determine depth information for the one or more objects based on the actual phase shift (950). For example, the distance calculator 700 may determine the depth information based, at least in part, on a round-trip time (RTT) of the transmitted light. The RTT is reflected in the actual phase shift between the reflected light and the transmitted light. Thus, since the speed of light is a known quantity, the distance calculator 700 may calculate the depth information based on the actual phase shift.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A time-of-flight (ToF) sensor, comprising:
   a light source configured to transmit periodic bursts of light in a direction of one or more objects;
   an array of optical sensing elements configured to detect light reflected from the one or more objects; and
   a distance calculator configured to receive sensor data corresponding to the detected light from the array of optical sensing elements and to determine depth information of the one or more objects by:
   determining a general phase shift of the reflected light relative to the transmitted light based at least in part on a first frame of the sensor data and a second frame of the sensor data;
   calculating an incremental phase shift of the reflected light relative to the transmitted light based at least in part on a linear relationship between the first frame and the second frame in relation to the general phase shift;
   combining the general phase shift with the incremental phase shift to determine an actual phase shift of the reflected light relative to the transmitted light; and
   determining the depth information based on the actual phase shift.

2. The ToF sensor of claim 1, wherein the first frame of sensor data is acquired during a plurality of first sensing cycles and the second frame of sensor data is acquired during a plurality of second sensing cycles that are offset in phase relative to the first sensing cycles.

3. The ToF sensor of claim 2, wherein the general phase shift is determined based at least in part on the phase offset between the first sensing cycles and the second sensing cycles.

4. The ToF sensor of claim 1, wherein the distance calculator is to determine the general phase shift based at least in part on whether the first frame of sensor data comprises a positive value or a negative value and whether the second frame of sensor data comprises a positive value or a negative value.

5. The ToF sensor of claim 4, wherein the general phase shift is equal to:
- 0° when the first frame of sensor data comprises a positive value and the second frame of sensor data comprises a positive value;
- 90° when the first frame of sensor data comprises a negative value and the second frame of sensor data comprises a positive value;
- 180° when the first frame of sensor data comprises a negative value and the second frame of sensor data comprises a negative value; and
- 270° when the first frame of sensor data comprises a positive value and the second frame of sensor data comprises a negative value.

6. The ToF sensor of claim 1, wherein the general phase shift comprises a value of 0°, 90°, 180°, or 270°.

7. The ToF sensor of claim 6, wherein the linear relationship depends on the value of the general phase shift.

8. The ToF sensor of claim 7, wherein the first frame represents a real component of the sensor data (Real) and the second frame represents an imaginary component of the sensor data (Imaginary), and wherein the incremental phase shift is equal to:

$$\frac{\text{Imaginary}}{\text{Imaginary} + \text{Real}}$$

when the value of the general phase shift is 0°;

$$\frac{-\text{Real}}{\text{Imaginary} - \text{Real}}$$

when the value of the general phase shift is 90°;

$$\frac{-\text{Imaginary}}{-\text{Imaginary} - \text{Real}}$$

when the value of the general phase shift is 180°; and $$\frac{\text{Real}}{\text{Real} - \text{Imaginary}}$$

when the value of the general phase shift is 270°.

9. The ToF sensor of claim 1, wherein the distance calculator is further configured to:
- determine a real component of the sensor data based on a difference between the first frame and a third frame of the sensor data;
- determine an imaginary component of the sensor data based on a difference between the second frame and a fourth frame of the sensor data; and
- determine the general phase shift based at least in part on whether the real component comprises a positive value or a negative value and whether the imaginary component comprises a positive value or a negative value.

10. The ToF sensor of claim 9, wherein the distance calculator is to further calculate the incremental phase shift based on a linear relationship between the real component and the imaginary component in relation to the general phase shift.

11. A method of determining depth information, comprising:
- receiving sensor data from an array of optical sensing elements configured to detect light reflected from one or more objects;
- determining a general phase shift of the reflected light relative to respective bursts of light periodically transmitted in a direction of the one or more objects based at least in part on a first frame of the sensor data and a second frame of the sensor data;
- calculating an incremental phase shift of the reflected light relative to the transmitted light based at least in part on a linear relationship between the first frame and the second frame in relation to the general phase shift;
- combining the general phase shift with the incremental phase shift to determine an actual phase shift of the reflected light relative to the transmitted light; and
- determining depth information for the one or more objects based on the actual phase shift.

12. The method of claim 11, further comprising:
- acquiring the first frame of sensor data during a plurality of first sensing cycles; and
- acquiring the second frame of sensor data during a plurality of second sensing cycles that are offset in phase relative to the first sensing cycles.

13. The method of claim 12, wherein the general phase shift is determined based at least in part on the phase offset between the first sensing cycles and the second sensing cycles.

14. The method of claim 11, wherein the determining of the general phase shift comprises:
- determining whether the first frame of sensor data comprises a positive value or a negative value; and
- determining whether the second frame of sensor data comprises a positive value or a negative value.

15. The method of claim 14, wherein the general phase shift is equal to:
- 0° when the first frame of sensor data comprises a positive value and the second frame of sensor data comprises a positive value;
- 90° when the first frame of sensor data comprises a negative value and the second frame of sensor data comprises a positive value;
- 180° when the first frame of sensor data comprises a negative value and the second frame of sensor data comprises a negative value; and
- 270° when the first frame of sensor data comprises a positive value and the second frame of sensor data comprises a negative value.

16. The method of claim 11, wherein the general phase shift comprises a value of 0°, 90°, 180°, or 270° and the linear relationship depends on the value of the general phase shift.

17. The method of claim 16, wherein the first frame represents a real component of the sensor data (Real) and the second frame represents an imaginary component of the sensor data (Imaginary), and wherein the incremental phase shift is equal to:

$$\frac{\text{Imaginary}}{\text{Imaginary} + \text{Real}}$$

when the value of the general phase shift is 0°;

$$\frac{-\text{Real}}{\text{Imaginary} - \text{Real}}$$

when the value of the general phase shift is 90°;

$$\frac{-\text{Imaginary}}{-\text{Imaginary} - \text{Real}}$$

when the value of the general phase shift is 180°; and $$\frac{\text{Real}}{\text{Real} - \text{Imaginary}}$$

when the value of the general phase shift is 270°.

18. The method of claim 11, wherein the determining of the general phase shift further comprises:
  determining a real component of the sensor data based on a difference between the first frame and a third frame of the sensor data; and
  determining an imaginary component of the sensor data based on a difference between the second frame and a fourth frame of the sensor data, wherein the general phase shift is determined based at least in part on whether the real component comprises a positive value or a negative value and whether the imaginary component comprises a positive value or a negative value.

19. The method of claim 18, wherein the incremental phase shift is calculated based on a linear relationship between the real component and the imaginary component in relation to the general phase shift.

20. A sensing device comprising:
  a processing system; and
  a memory storing instructions that, when executed by the processing system, cause the sensing device to:
    receive sensor data from an array of optical sensing elements configured to detect light reflected from one or more objects;
    determine a general phase shift of the reflected light relative to respective bursts of light periodically transmitted in a direction of the one or more objects based at least in part on a first frame of the sensor data and a second frame of the sensor data;
    calculate an incremental phase shift of the reflected light relative to the transmitted light based at least in part on a linear relationship between the first frame and the second frame in relation to the general phase shift;
    combine the general phase shift with the incremental phase shift to determine an actual phase shift of the reflected light relative to the transmitted light; and
    determine depth information for the one or more objects based on the actual phase shift.

* * * * *